United States Patent
He

(10) Patent No.: US 9,897,843 B2
(45) Date of Patent: Feb. 20, 2018

(54) OPTICAL FILM FOR ENLARGING VIEWING ANGLE AND TFT-LCD DEVICE INCLUDING THE SAME

(71) Applicant: Shenzhen China Star Optoelectronics Technology Co., Ltd., Shenzhen, Guangdong (CN)

(72) Inventor: Hu He, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 101 days.

(21) Appl. No.: 14/895,185

(22) PCT Filed: Oct. 23, 2015

(86) PCT No.: PCT/CN2015/092721
§ 371 (c)(1),
(2) Date: Dec. 1, 2015

(87) PCT Pub. No.: WO2016/197519
PCT Pub. Date: Dec. 15, 2016

(65) Prior Publication Data
US 2017/0153491 A1    Jun. 1, 2017

(30) Foreign Application Priority Data

Jun. 10, 2015 (CN) .......................... 2015 1 0317571

(51) Int. Cl.
*G02F 1/1335* (2006.01)
*G02F 1/1368* (2006.01)
*G02B 5/04* (2006.01)

(52) U.S. Cl.
CPC ....... *G02F 1/133504* (2013.01); *G02B 5/045* (2013.01); *G02F 1/1368* (2013.01); *G02F 1/133514* (2013.01); *G02F 1/133528* (2013.01)

(58) Field of Classification Search
CPC .... G02B 6/0053; G02B 5/045; G02B 6/0038; G02B 6/005; G02B 27/0172; G02B 6/00;
(Continued)

(56) References Cited

U.S. PATENT DOCUMENTS

2005/0280752 A1* 12/2005 Kim ...................... G02B 5/0221
                                                                    349/62
2008/0049330 A1*  2/2008 Tolbert ............. G02F 1/133606
                                                                    359/599
(Continued)

FOREIGN PATENT DOCUMENTS

CN          104991370 A      10/2005
CN            1740864 A       3/2006
(Continued)

*Primary Examiner* — Huyen Ngo
(74) *Attorney, Agent, or Firm* — Andrew C. Cheng

(57) ABSTRACT

The viewing angle enhancement film contains a substrate and a prism layer fixedly attached to the substrate. A light emission face of the prism layer contacts a light incident face of the substrate. The prism layer and the substrate are both made of transparent materials. Multiple separate triangular prisms are configured along a light incident face of the prism layer with a flat face between neighboring triangular prisms. The TFT-LCD device contains a first polarizer film, a LCD panel, a color filter film, a second polarizer film, and a viewing angle enhancement film described above, arranged sequentially along a light propagation direction. A light incident face of the viewing angle enhancement film faces a light emission face of the second polarizer film. The TFT-
(Continued)

LCD device equipped with the viewing angle enhancement film is able to provide enlarged viewing angle and superior image quality.

5 Claims, 3 Drawing Sheets

(58) Field of Classification Search
CPC .. G02B 6/0045; G02B 27/283; G02B 27/126;
G02F 1/133606; G02F 2001/133607;
G02F 1/133528; G02F 1/133504; G02F
1/133615; G02F 1/133514; G02F 1/292;
H04N 9/3105; H04N 9/3167
See application file for complete search history.

(56) References Cited

U.S. PATENT DOCUMENTS

| | | | |
|---|---|---|---|
| 2009/0111534 A1* | 4/2009 | Lu | H05K 5/0243 455/575.1 |
| 2010/0134720 A1* | 6/2010 | Choi | G02B 5/0221 349/64 |
| 2015/0168631 A1* | 6/2015 | Umekawa | G02B 6/0016 362/613 |

FOREIGN PATENT DOCUMENTS

| | | |
|---|---|---|
| CN | 1740864 A | 3/2006 |
| CN | 202049253 U | 11/2011 |
| CN | 203811948 U | 9/2014 |

\* cited by examiner

|  | Reference | Embodiment 1 |
|---|---|---|
| L | - | 50 |
| P | - | 200 |
| Brightness (%) | 100% | 75% |
| Visual diagram | | |

|  | Embodiment 2 | Embodiment 3 |
|---|---|---|
| L | 25 | 10 |
| P | 100 | 40 |
| Brightness (%) | 75% | 75% |
| Visual diagram | | |

Figure 7

OPTICAL FILM FOR ENLARGING VIEWING ANGLE AND TFT-LCD DEVICE INCLUDING THE SAME

BACKGROUND OF THE INVENTION

1. Field of the Invention

The present invention relates to the enhancement of viewing angle of liquid crystal displays, and in particular to a viewing angle enhancement film and a thin film transistor liquid crystal display (TFT-LCD) device incorporating the film.

2. The Related Arts

TFT-LCD device is a type of LCD device that employs TFT technology to achieve the presentation of images. Simply put, a TFT-LCD device involves a liquid crystal layer sandwiched between two glass substrates. A color filter film is configured on the upper glass substrate whereas TFTs are configured in the lower glass substrate. When electricity is conducted through the TFTs to produce electrical fields, the liquid crystal molecules are twisted by the electrical fields, thereby altering the polarization of light passing through. Additionally, a polarizer film can be configured in the TFT-LCD device so as to control the dark or bright states of pixels, and the emission of polarized light from the pixels, thereby achieving the desired presentation of images.

The problem of the existing technology is that, when back light passes through the polarizer film and TFTs, the light would become directional. In other words, most of the light emits perpendicularly from the screen. Therefore, when the LCD device is viewed from an angle, sometimes the presented image cannot be seen, and sometimes only purely white or purely black image can be seen.

FIG. 1 provides relationships between viewing angle and brightness, and between viewing angle and color coordinates, for a white image on an ordinary LCD device. From the leftmost diagram of FIG. 1, when the viewing angle is greater than 100 degree, the brightness would drop below ⅓ of the brightness along the direction normal to the screen (0 degree). To achieve a greater brightness, such as ½ of the brightness along the normal direction, the viewing angle has to be rather narrow. From the two diagrams in the middle and to the right of FIG. 1, one can see that color shift is more severe under a larger viewing angle.

On the other hand, consumers continuously demand even higher quality from LCD devices. And, as the dimension of LCD devices is getting larger, more people would be sharing a single LCD device. Therefore, the enhancement of viewing angle is of great concern to manufacturers.

SUMMARY OF THE INVENTION

To obviate the shortcoming of the prior art, the present invention provides a novel viewing angle enhancement film and a thin film transistor liquid crystal display (TFT-LCD) device incorporating the film. The TFT-LCD device provides enlarged viewing angles with enhanced display quality.

The viewing angle enhancement film contains a prism layer having a light incident face and an opposing light emission face, and a substrate having a light incident face and an opposing light emission face. The prism layer is fixedly attached to the substrate. The light emission face of the prism layer contacts the light incident face of the substrate. The prism layer and the substrate are both made of transparent materials. A plurality of separate triangular prisms are configured along the light incident face of the prism layer with a flat face between each pair of neighboring triangular prisms.

In one embodiment, the triangular prisms have triangular bases that are similar triangles.

In one embodiment, at least two neighboring triangular prisms have triangular bases with an identical base length.

In addition, for at least two sets of neighboring triangular prisms whose base lengths of their triangular bases are identical, each triangular prism has an identical L/P value where L is the triangular prism's base length and P is the triangular prism's interval distance to a next triangular prism.

In one embodiment, the triangular prisms have triangular bases that are isosceles triangles.

In one embodiment, the triangular prisms are dispersed across the light incident face of the prism layer.

In one embodiment, the triangular prisms are arranged in parallel along the light incident face of the prism layer.

The substrate is made of PET, PC, or PMMA.

The present invention also provides a TFT-LCD device contains a first polarizer film, a LCD panel, a color filter film, a second polarizer film, and a viewing angle enhancement film described above, arranged sequentially along a light propagation direction. A light incident face of the viewing angle enhancement film faces a light emission face of the second polarizer film. According to the present invention, a TFT-LCD device equipped with a viewing angle enhancement film of the present invention is able to provide enlarged viewing angle, reduced possibility of moiré pattern, enhanced light transmission, and improved display effect, thereby achieving superior image quality.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings:

FIG. 7 provides a comparison table among TFT-LCD devices equipped with viewing angle enhancement films of the above embodiments and an ordinary LCD device.

DETAILED DESCRIPTION OF THE PREFERRED EMBODIMENTS

Figure 1:
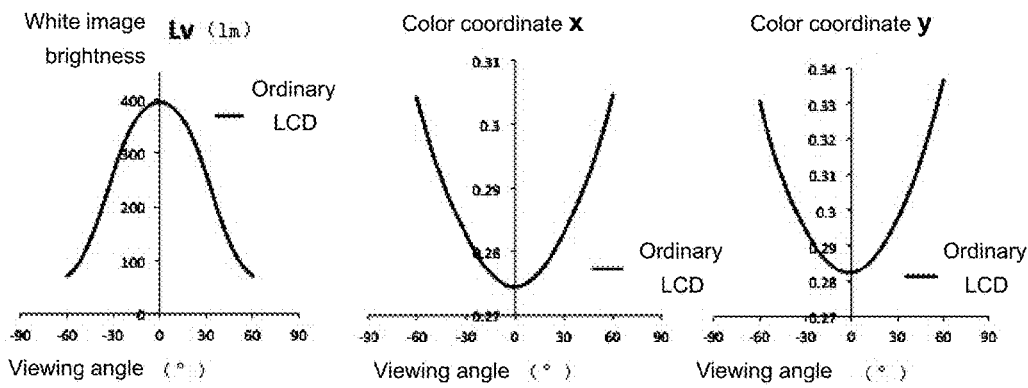
FIG. 1 provides relationships between viewing angle and brightness, and between viewing angle and color coordinates, for a white image on an ordinary liquid crystal display (LCD) device.
Figure 2:
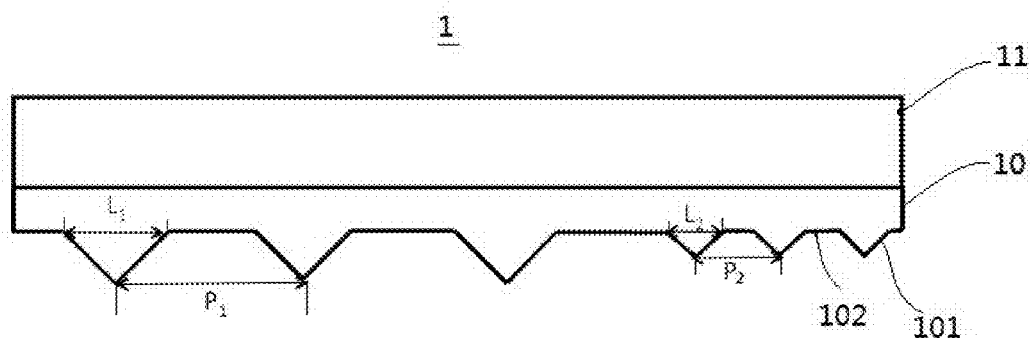
FIG. 2 is a sectional diagram showing a viewing angle enhancement film according to a first embodiment of the present invention.

FIG. 2 is a sectional diagram showing a viewing angle enhancement film 1 according to a first embodiment of the present invention.

As illustrated, the viewing angle enhancement film 1 contains a prism layer 10 and substrate 11, both made of transparent materials. The prism layer 10 contains oppositely configured light incident face and light emission face. The prism layer 10 is fixedly attached to the substrate 11 and the light emission face of the prism layer 10 contacts a light incident face of the substrate 11. A number of separate triangular prisms 101 are arranged along the light incident face of the prism layer 10. A flat face 102 is reversed between neighboring triangular prisms 101 and each triangular prism 101 has a bottom side co-planar with the neighboring flat faces 102. Like the flat faces 102, the two slant sides of the triangular prisms 101 are also for light incidence.

The triangular prisms 101 can be dispersed across, or arranged in parallel along the light incident face of the prism layer 10.

Preferably, the triangular bases of the triangular prisms 101 are similar triangles. Therefore, the triangular prisms 101 achieve identical refraction effect to incident light so that the enhancement of viewing angle from any location on a light emission face of a liquid crystal display (LCD) device is generally identical. Additionally, the triangular bases of the triangular prisms 101 can be isosceles triangles.

Furthermore, the base lengths of the triangular bases of the triangular prisms 101 can be identical and the triangular prisms 101 are arranged at equal intervals. However, this periodical arrangement of the triangular prisms 101 would interfere with the pixels of the LCD device, and moiré pattern may occur. Therefore, preferably, the base lengths of the triangular bases of the triangular prisms 101 are different, and the triangular prisms 101 can also be arranged at different intervals.

For neighboring triangular prisms 101 whose base lengths of their triangular bases are identical, their L/P value should be identical where L is the base length and P is the interval distance. As shown in FIG. 2, the three triangular prisms 101 to the left all have an identical base length $L_1$ and an identical interval distance $P_1$, the three triangular prisms 101 to the right all have a shorter identical base length $L_2$ and a shorter identical interval distance $P_2$, and $L_1/P_1$ is equal to $L_2/P_2$. Please note that the number of triangular prisms 101 to the left or right is irrelevant.

The key is that L and P can vary simultaneously so that the triangular prisms' dimensions and periods also constantly vary. This irregular arrangement of the triangular prisms 101, on one hand, makes the light incident face of the prism layer 10 appear rugged and, on the other hand, a beneficial effect is that moiré pattern is less likely to occur as the interference between the triangular prisms 101 and the pixels of the LCD device is avoided.

According to the present invention, the substrate 11 can be made of a plastic material and can have a specific toughness. For example, the substrate 11 can be made of PET, PC, or PMMA but the present invention is not limited as such. The substrate 11 can also be made of other materials such as glass.

Figure 3:
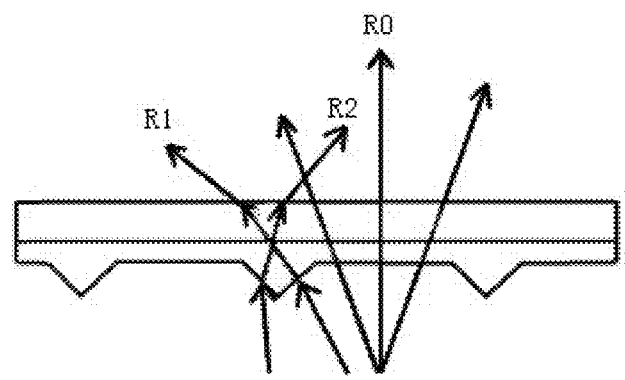
FIG. 3 is a sectional diagram showing the operation of a viewing angle enhancement film according to the present invention.

FIG. 3 is a sectional diagram showing the operation of a viewing angle enhancement film according to the present invention. As illustrated, light beams R1 and R2 enters a viewing angle enhancement film 1 through two slant sides of a triangular prism 101, respectively. They then pass through the prism layer 10 and the substrate 11, and emit from the light emission face of the substrate 11. Due to the refraction by the prism layer 10 and the substrate 11, light beams R1 and R2 would have a greater included angle with a normal direction of the light emission face of the substrate 11. In other words, viewing from a greater viewing angle would sense a greater brightness, thereby enhancing the LCD device's viewing angle. As to light beam R0 which perpendicularly enters the viewing angle enhancement film 1 through the flat face 102, light beam R0 emitted from the light emission face of the substrate 11 would remain perpendicular, thereby preserving its propagation direction and the brightness along the normal direction. In addition, the configuration of the flat faces 102 would reduce the material consumption for manufacturing the prism layer 10 and therefore the production cost of the viewing angle enhancement film 1.

Figure 4:
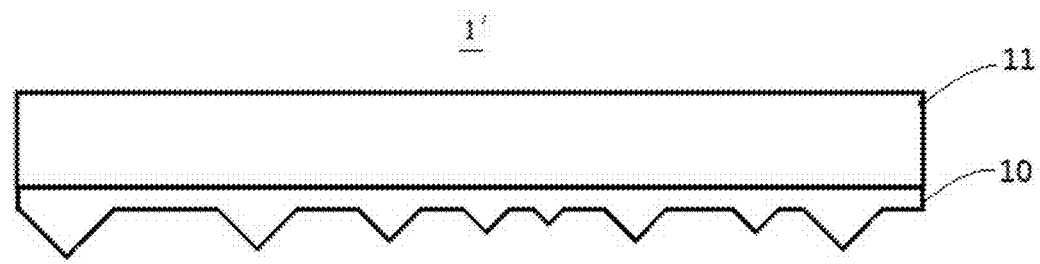
FIG. 4 is a sectional diagram showing a viewing angle enhancement film according to a second embodiment of the present invention.
Figure 5:
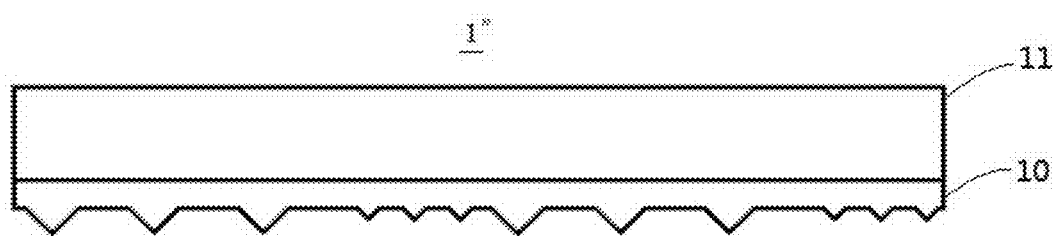
FIG. 5 is a sectional diagram showing a viewing angle enhancement film according to a third embodiment of the present invention.

FIG. 4 is a sectional diagram showing a viewing angle enhancement film according to a second embodiment of the present invention. FIG. 5 is a sectional diagram showing a viewing angle enhancement film according to a third embodiment of the present invention. As illustrated, as long as the above condition regarding L/P is satisfied, triangular prisms 101 can have randomly varied L's and P's and therefore triangular prisms 101 of different and identical dimensions can be freely arranged along the light incident face of the prism layer 10 at different intervals. This can guarantee that, when the viewing angle enhancement film 1 is adhered to the LCD device, most part of the prism layer 10 is not affected by the adhesive and the refraction interface between air and the prism layer 10 would be preserved. In addition, when light is projected from air onto the light incident face of the prism layer 10, i.e. from an optically thinner medium onto an optically denser medium, total reflection can be avoided, thereby enhancing light transmission.

Figure 6:
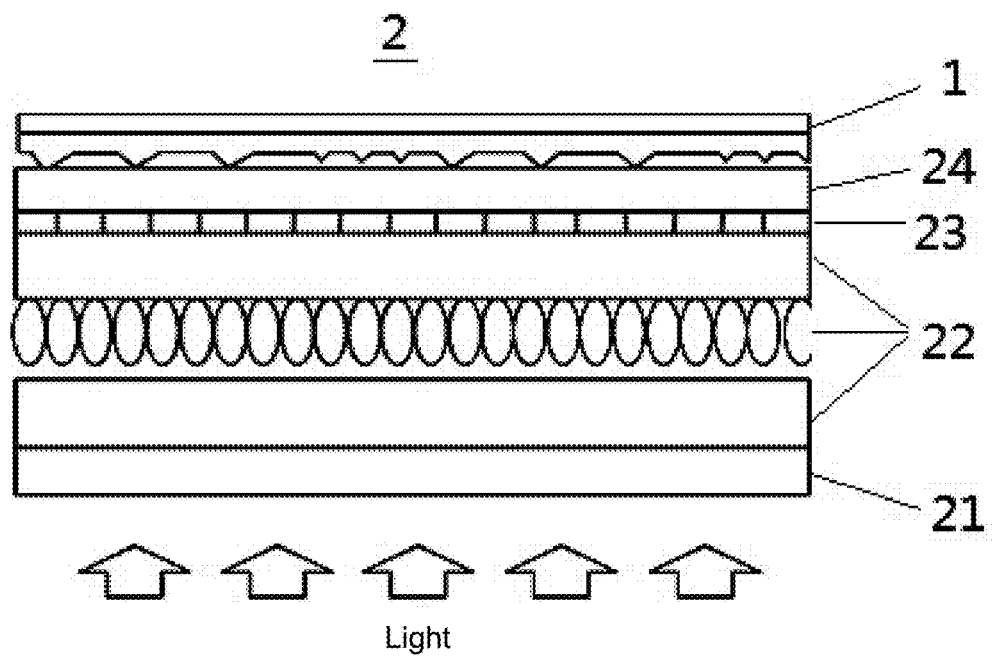
FIG. 6 is a sectional diagram showing a viewing angle enhancement film according to the present invention applied to a thin film transistor LCD device.

FIG. 6 is a sectional diagram showing a viewing angle enhancement film 1 according to the present invention applied to a thin film transistor LCD (TFT-LCD) device 2. As illustrated, the TFT-LCD device 2 contains a first polarizer film 21, a LCD panel 22, a color filter film 23, and a second polarizer film 24, arranged sequentially along a light propagation direction. The viewing angle enhancement film 1 is configured on the second polarizer film 24 of the TFT-LCD device 2 with the light incident face of the viewing angle enhancement film 1 facing a light emission face of the second polarizer film 24.

FIG. 7 provides a comparison table among TFT-LCD devices equipped with viewing angle enhancement films of the previous embodiments and an ordinary LCD device.

As illustrated, an ordinary LCD device is used as reference whose brightness along the normal direction of its light emission face is considered 100%. For the previous three embodiments, they have an identical L/P value 0.25 (50/200=0.25, 25/100=0.25, and 10/40=0.25), and the brightness along the normal direction of the TFT-LCD devices' light emission faces is all 75%. From FIG. 7 one can clearly see that these TFT-LCD devices achieve greater viewing angles for a brightness that is ½ of that along the normal direction.

According to the present invention, triangular prisms of different dimensions are arranged along the light incident face of the viewing angle enhancement film at different intervals. This can guarantee that most part of the prism layer is not affected by adhesive and the refraction interface between air and the prism layer is preserved. In addition, when light is projected from air onto the light incident face of the prism layer, i.e. from an optically thinner medium onto an optically denser medium, total reflection is avoided, thereby enhancing light transmission.

A TFT-LCD device equipped with a viewing angle enhancement film of the present invention is able to provide enlarged viewing angle, reduced possibility of moiré pattern, enhanced light transmission, and improved display effect, thereby achieving superior image quality.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A viewing angle enhancement film, comprising:
a prism layer having a light incident face and an opposing light emission face; and a substrate having a light incident face and an opposing light emission face; wherein the prism layer is fixedly attached to the substrate; the light emission face of the prism layer contacts the light incident face of the substrate; the prism layer and the substrate are both made of transparent materials; a plurality of separate triangular prisms are configured along the light incident face of the prism layer protruding away from the substrate and towards a projection of light; each pair of neighboring triangular prisms are separated by a flat face; the triangular prisms comprises at least two sets of neighboring triangular prisms; each triangular prism of a first set has a base length L1 and an interval distance P1 to a neighboring triangular prism of the first set; each triangular prism of a second set has a base length L2 and an interval distance P2 to a neighboring triangular prism of the second set; L1 is not equal to L2; and L1/P1 is equal to L2/P2.

2. The viewing angle enhancement film as claimed in claim 1, wherein the triangular prisms are shaped as similar triangles.

3. The viewing angle enhancement film as claimed in claim 2, wherein the triangular prisms are shaped as isosceles triangles.

4. The viewing angle enhancement film as claimed in claim 1, wherein the substrate is made of one of PET, PC, and PMMA.

5. A thin film transistor liquid crystal display (TFT-LCD) device comprising a first polarizer film, a LCD panel, a color filter film, a second polarizer film, and a viewing angle enhancement film, arranged sequentially along a light propagation direction; wherein a light incident face of the viewing angle enhancement film faces a light emission face of the second polarizer film; and the viewing angle enhancement film comprises a prism layer having a light incident face and an opposing light emission face; and a substrate having a light incident face and an opposing light emission face; wherein the prism layer is fixedly attached to the substrate; the light emission face of the prism layer contacts the light incident face of the substrate; the prism layer and the substrate are both made of transparent materials; a plurality of separate triangular prisms are configured along the light incident face of the prism layer protruding away from the substrate and towards a projection of light; each pair of neighboring triangular prisms are separated by a flat face; the triangular prisms comprises at least two sets of neighboring triangular prisms; each triangular prism of a first set has a base length L1 and an interval distance P1 to a neighboring triangular prism of the first set; each triangular prism of a second set has a base length L2 and an interval distance P2 to a neighboring triangular prism of the second set; L1 is not equal to L2; and L1/P1 is equal to L2/P2.

* * * * *